(12) United States Patent
Joo

(10) Patent No.: US 11,345,460 B1
(45) Date of Patent: May 31, 2022

(54) ROTATABLE EMPENNAGE FOR AN AIRCRAFT

(71) Applicant: Government of the United States, as represented by the Secretary of the Air Force, Wright-Patterson AFB, OH (US)

(72) Inventor: James Joo, Centerville, OH (US)

(73) Assignee: United States of America as represented by the Secretary of the Air Force, Wright-Patterson AFB, OH (US)

( * ) Notice: Subject to any disclaimer, the term of this patent is extended or adjusted under 35 U.S.C. 154(b) by 88 days.

(21) Appl. No.: 16/886,932

(22) Filed: May 29, 2020

Related U.S. Application Data

(60) Provisional application No. 62/866,024, filed on Jun. 25, 2019.

(51) Int. Cl.
*B64C 5/02* (2006.01)
*B64C 13/34* (2006.01)
*B64C 13/50* (2006.01)

(52) U.S. Cl.
CPC .............. *B64C 5/02* (2013.01); *B64C 13/34* (2013.01); *B64C 13/503* (2013.01)

(58) Field of Classification Search
CPC ......... B64C 5/02; B64C 13/34; B64C 13/503; B64C 1/26
See application file for complete search history.

(56) References Cited

U.S. PATENT DOCUMENTS

| | | | |
|---|---|---|---|
| 4,538,779 A | 9/1985 | Goldstein | |
| 7,308,762 B2 | 12/2007 | Bath et al. | |
| 7,556,030 B2 | 7/2009 | Sacristan | |
| 8,061,655 B1 | 11/2011 | Manley et al. | |
| 2004/0089765 A1* | 5/2004 | Levy | B64C 9/32 244/113 |
| 2008/0164375 A1* | 7/2008 | Garcia Laja | B64C 1/26 244/131 |
| 2018/0178899 A1* | 6/2018 | Har | B64D 27/24 |
| 2018/0178910 A1* | 6/2018 | Har | B64C 5/02 |
| 2020/0148329 A1* | 5/2020 | White | B64C 5/02 |

* cited by examiner

*Primary Examiner* — Rodney A Bonnette
(74) *Attorney, Agent, or Firm* — AFMCLO/JAZ; Matthew D Fair

(57) ABSTRACT

An aircraft having an empennage rotatable about a longitudinal axis via an electric motor drive is disclosed herein. A pair of horizontal stabilizers extend from opposing sides of the rotatable empennage and are independently rotatable via electric motor drives. The rotatable empennage is operable for controlling yaw, pitch and rolling moments without a traditional vertical stabilizer and rudder system which can reduce weight as well as the radar cross section of the aircraft. This technology can also be applied to a weapon control system such missile such as a missile.

21 Claims, 3 Drawing Sheets

ROTATABLE EMPENNAGE FOR AN AIRCRAFT

RIGHTS OF THE GOVERNMENT

The invention described herein may be manufactured and used by or for the Government of the United States for all governmental purposes without the payment of any royalty.

TECHNICAL FIELD

The present disclosure generally relates to an aircraft or missile system having a rotatable empennage and a pair of horizontal stabilizers configured tor provide yaw, roll and pitch control of the aircraft or missile system.

BACKGROUND

Aircraft are controlled about the roll, pitch and yaw axes by way of various control surfaces including ailerons, elevators and rudders. Typically, aircraft yaw is controlled by a fixed vertical stabilizer and an associated rudder. A vertical stabilizer provides limited control benefits, but has drawbacks such as adding unnecessary weight and generating a relative large radar cross section that enemy combatants can detect. For these and other reasons, existing systems have various shortcomings, drawbacks, and disadvantages relative to certain applications. Accordingly, there remains a need for further contributions in this area of technology.

SUMMARY

One embodiment of the present disclosure includes a unique rotatable empennage for an aircraft configured to provide capability for maneuvering the aircraft without a fixed vertical stabilizer and rudder system. Other embodiments include apparatuses, systems, devices, hardware, methods, and combinations wherein the rotatable empennage produces a smaller radar cross section relative to aircraft having a fixed vertical stabilizer and increases aerodynamic efficiency. Further embodiments, forms, features, aspects, benefits, and advantages of the present application shall become apparent from the description and figures provided herewith.

DETAILED DESCRIPTION OF THE ILLUSTRATIVE EMBODIMENTS

Figure 1:
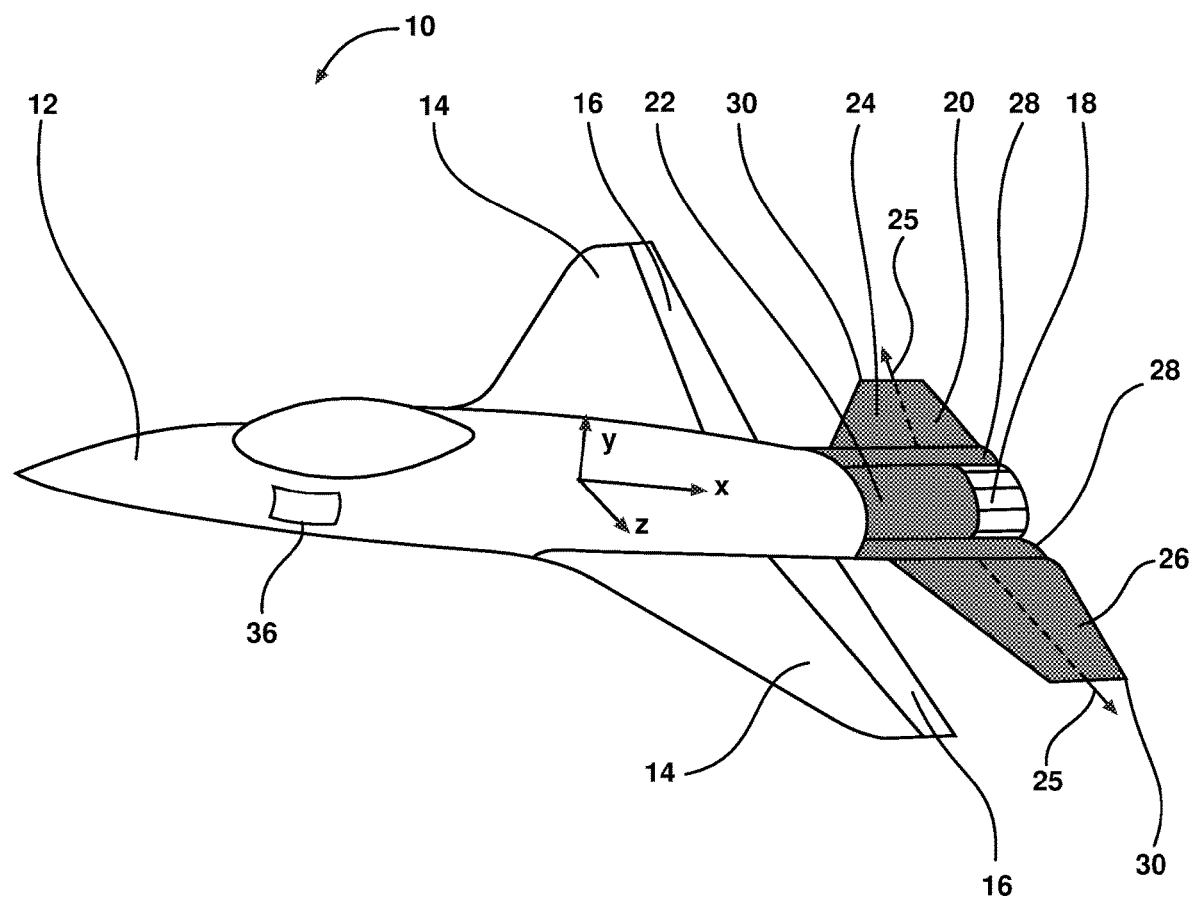
FIG. 1 is a schematic view of an exemplary aircraft having a rotatable empennage according one embodiment of the present disclosure.

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

The present disclosure defines an aircraft with a rotatable empennage operable to control at least a portion of the yaw, pitch and roll moments acting on the aircraft. This concept provides for control of the aircraft without a traditional vertical stabilizer and rudder system. By eliminating the vertical stabilizer, weight is removed from the aircraft and the radar cross section can be lowered substantially which is important when trying to avoid an enemy radar signal.

Referring now to FIG. 1, an aircraft 10 is illustrated in one exemplary embodiment of the present disclosure. In alternate embodiments, the present disclosure contemplates using the described system in other flight vehicles such as missiles or the like. The aircraft 10 includes a fuselage 12 extending along a longitudinal axis X with first and second wings 14 extending laterally generally along the Z axis from either side thereof. The wings 14 can include control surfaces 16 such as flaps, slats, ailerons or other types as one skilled in the art would understand. The control surfaces 16 connected to the wings 14 typically provide control of a roll moment as well as the lift/drag forces on the aircraft 10. An exhaust nozzle 18 is operable for discharging high temperature exhaust flow from an engine (not shown) at a high velocity to provide the propulsive thrust for the aircraft.

A rotatable empennage 20 is operably connected to the fuselage 12 of the aircraft 10. The rotatable empennage 20 includes a barrel housing 22 with first and second horizontal stabilizers 24, 26 extending from opposing sides thereof. It should be noted that the term "horizontal" does not mean that the horizontal stabilizers 24, 26 are actually horizontal in an absolute sense relative to the aircraft, but is merely used as a traditional description as is typical of tail control wings on prior art aircraft. The first and second horizontal stabilizers 24, 26 can be defined by a central axis 25 that generally extends from a root 28 to a tip 30 laterally along the Z axis from opposite sides of the empennage 20. The centerline axis 25 may or may not be oriented 90 degrees from the X axis or the Y axis as is traditionally defined in the X, Y, and Z Cartesian coordinate system. On the contrary, the central axis 25 for each of the first and second horizontal stabilizers 24, 26 may vary anywhere from approximately +/−90 degrees from the X and Y axes.

A power and control system 36 can include, but is not limited to a computer CPU; a memory, input/output systems, pressure, temperature and position sensors, an electrical power generator, backup battery(s), actuators, and other components as would be known to those skilled in the art. The aircraft 10 is controlled in the air by changing the aerodynamic forces or moments acting about the X, Y and Z axes. The X axis defines a longitudinal axis or roll axis extending from the forward end to the aft end of the aircraft 10. The Y axis defines a vertical axis or a yaw axis that is normal to the X axis. The Z axis or pitch axis extends laterally and is normal to both the X and Y axes. Typically, a vertical stabilizer and rudder are used to control the moment about the Yaw axis. The novel aircraft system described herein can control the yaw force without a vertical stabilizer and rudder as will be described in more detail below.

Figure 2:
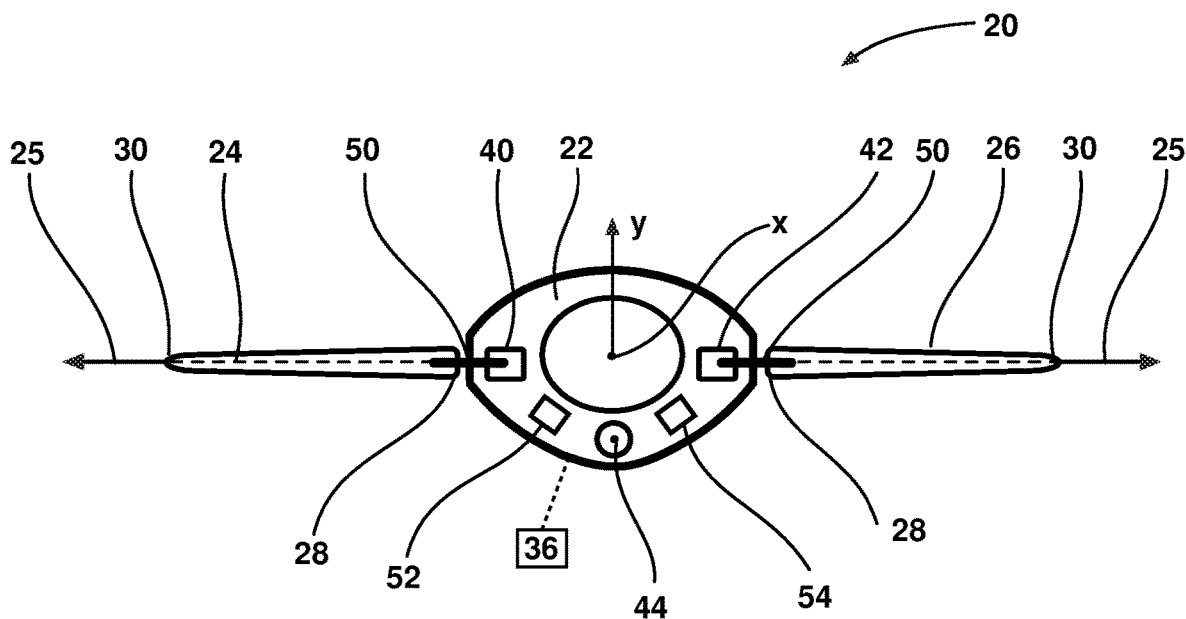
FIG. 2 is a schematic cross sectional view of the rotatable empennage.
Figure 3:
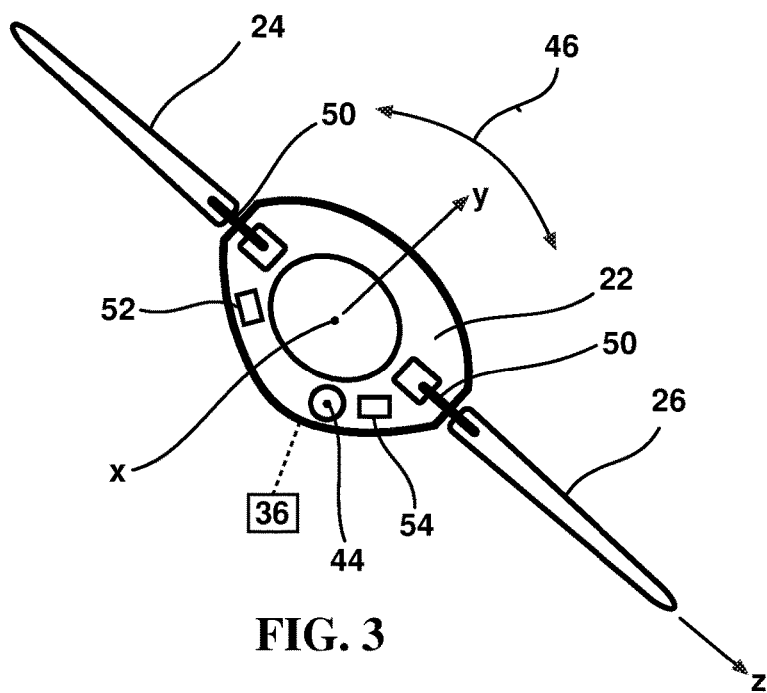
FIG. 3 is a schematic cross sectional view of the rotatable empennage rotated about a longitudinal axis relative to the view shown in FIG. 2.

Referring now to FIGS. 2 and 3, a schematic cross sectional view of the rotatable empennage 20 is illustrated. A first horizontal stabilizer electric motor 40 is operably connected to the first horizontal stabilizer 24. The electric motor 40 rotates the first horizontal stabilizer 24 about the central axis 25. In one form, the rotation can be in either direction +/−90 degrees, in other forms the rotation may be greater such as a full 360 degrees. A second horizontal stabilizer electric motor 42 is operably connected to the second horizontal stabilizer 26. The electric motor 42 rotates the second horizontal stabilizer 26 about the central axis 25. In one form, the rotation can be in either direction +/−90 degrees, in other forms the rotation may be greater such as 180 degrees. In other forms, a linear actuator may be connected to a mechanism such as four-bar linkage mechanism to drive rotation of the first and second horizontal stabilizers 24 and 26, respectively, depending on internal space requirements. An empennage motor 44 is operable to rotate the barrel housing 22 of the empennage 20 about the X axis in either direction +/−360 degrees, relative to the fuselage 12 of the aircraft 10. In other forms, the rotation can be greater than 360 degrees. The actuator(s) and the electric motors can be located in either a barrel housing 22 or a fuselage 22 depending on inertia and/or space consideration to house the actuator.

FIG. 3 depicts a rotation of the empennage 20 about the X axis relative to FIG. 2. The rotation can occur in either direction as indicated by the double arrow 46. A mechanical linkage 50 connects the first and second electric motors 40, 42 to the first horizontal stabilizer 24 and the second horizontal stabilizer 26, respectively. The linkage 50 can include, but is not limited to one or more transmission shafts, bearings, seals, connectors and fasteners as one skilled in the art would readily understand. Furthermore a gear transmission system or gear train 52 may be connected to one or more of the electric motors 40, 42, 44 so that the torque/speed input to the barrel housing 22 and horizontal stabilizers 24, 26 may be varied relative to an output of a drive motor. While the disclosed embodiment depicts one motor to drive each horizontal stabilizer 24, 26 and the barrel housing 22, it is contemplated that a plurality of electric motors may be utilized either in series or as parallel backup motors. Also, during standard operation an electric generator connected to the aircraft engine will provide electrical power to the electric motors, however a battery backup system 54 can be operably coupled to the control system 36 to provide an emergency backup power should the engine or electric generator fail during flight. It should be understood that the cross sectional shape of the barrel housing 22 need not be as shown in the illustrative embodiments, but on the contrary may be of any functional shape conducive to operation of an aircraft, missile or other flight system.

Figure 4A:
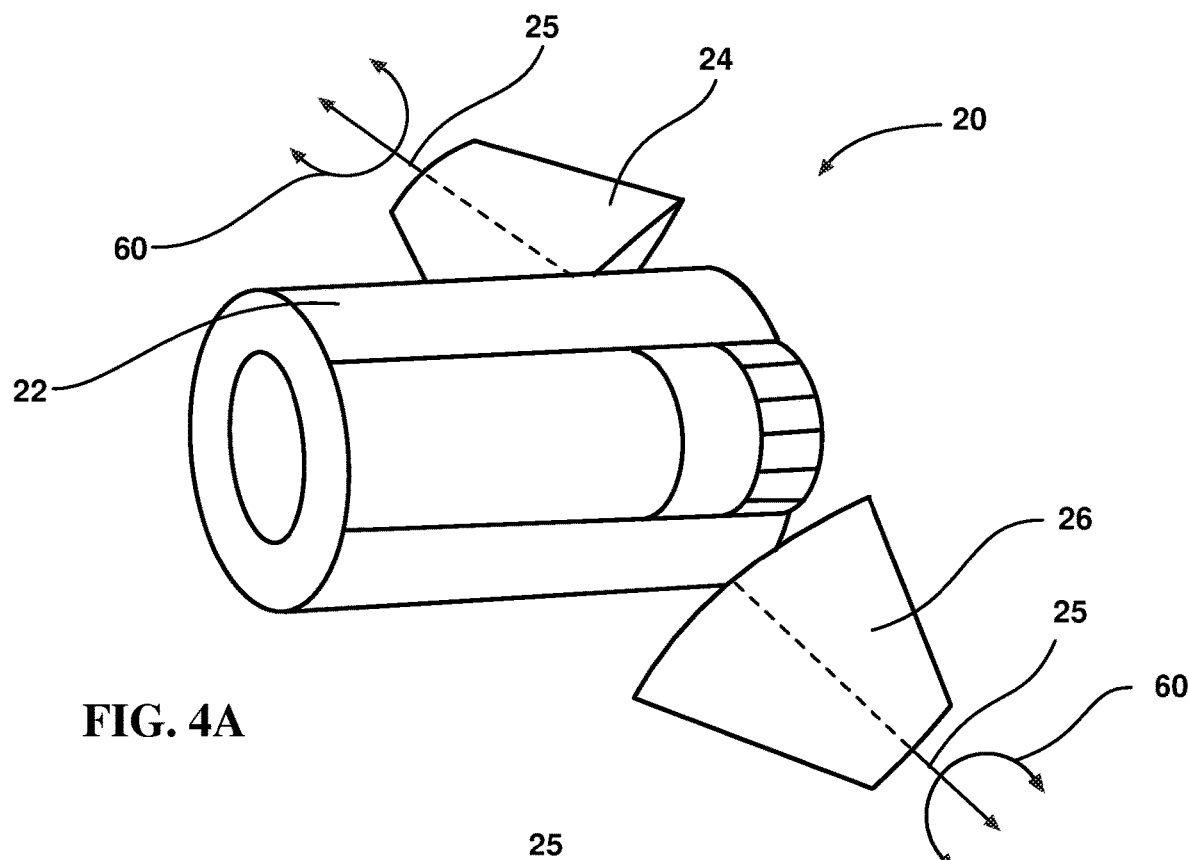
FIG. 4A is perspective view of the rotatable empennage with horizontal stabilizers rotated in the same direction about a lateral axis.
Figure 4B:
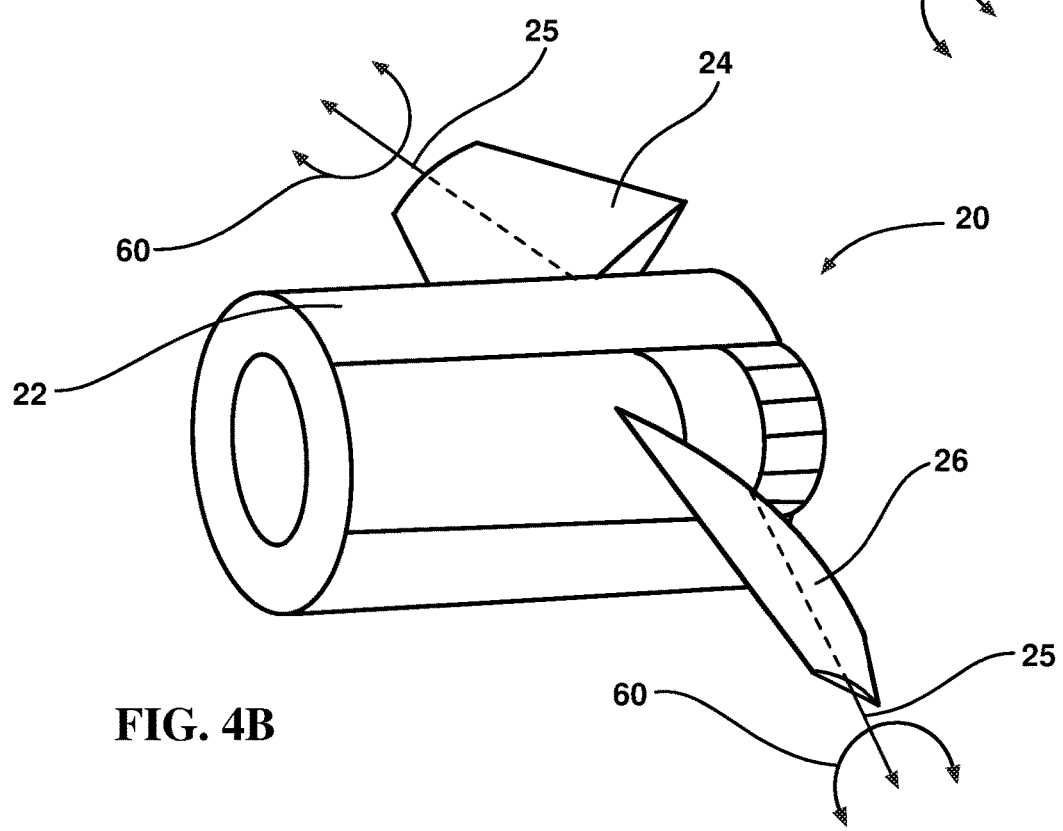
FIG. 4B is perspective view of the rotatable empennage with horizontal stabilizers rotated in opposite directions about a lateral axis.

Referring now to FIG. 4A, a perspective view of the rotatable empennage 20 is illustrated with the horizontal stabilizers 24, 26 rotated about their respective axes of rotation 25 as illustrated by the double arrow curve 60. In this depicted embodiment each of the horizontal stabilizers 24, 26 are rotated to the same relative angular orientation. FIG. 4B shows a perspective view of the rotatable empennage 20 similar to that shown in FIG. 4A, however the horizontal stabilizers 24, 26 are rotated about their respective axes of rotation 25 to a different angular orientation relative to one another. The speed of rotation as well as the position of the horizontal stabilizers 24, 26 are independently controlled.

In one aspect the present disclosure defines an aircraft comprising: a fuselage defining a longitudinal axis extending between a forward end and an aft end; a pair of wings extending laterally from opposing sides of the fuselage; a rotatable empennage positioned proximate an aft end of the fuselage; and first and second horizontal stabilizers extending from opposing sides of the rotatable empennage along a central axis.

In refining aspects, the aircraft includes: an empennage motor operable for rotating the empennage three hundred and sixty degrees (360) in either direction about the longitudinal axis; first and second horizontal stabilizer motors operably coupled to the first and second horizontal stabilizers, respectively; wherein the empennage motor, first horizontal stabilizer motor and second horizontal stabilizer motor are directly connected to the empennage and the horizontal stabilizers, respectively; further comprising a gear system operably connected between at least one of the motors for the empennage and the horizontal stabilizers; a control system operably connected to the electric motors to control the position of the empennage and the horizontal stabilizers; wherein the rotatable empennage and horizontal stabilizers are operable for controlling at least a portion of the yaw, pitch and roll moments acting on the aircraft; wherein the first and second horizontal stabilizers are independently rotatable about the central axis; wherein the first and second horizontal stabilizers are rotatable ninety degrees (90) in either direction; wherein an angular position of the central axis is approximately between +1-90 degrees (+1-90) relative to the longitudinal axis and a vertical axis; and a linear actuator connected to a four bar linkage operable for rotating the first and second horizontal stabilizers.

In another aspect, the present disclosure includes a rotating empennage comprising: an empennage electric motor operable for rotating the empennage about a longitudinal axis; a first horizontal stabilizer extending from the empennage; a first horizontal stabilizer electric motor operable for rotating the first horizontal stabilizer about a central axis; a second horizontal stabilizer extending from the empennage; and a second horizontal stabilizer electric motor operable for rotating the second horizontal stabilizer about the central axis.

In refining aspects, the longitudinal axis extends between a forward end and an aft end of an aircraft fuselage and the central axis extends at an angular position approximately between +/−90 degrees (+/−90) relative to the longitudinal axis and a vertical axis; wherein the empennage is rotatable three hundred and sixty degrees (360) in either direction; wherein the first and second horizontal stabilizers are rotatable approximately ninety degrees (90) in either direction; a direct drive linkage connection between at least one of the electric motors and the empennage, the first horizontal stabilizer and/or the second horizontal stabilizer; and at least one gear drive connection between at least one of the electric motors and the empennage, the first horizontal stabilizer and/or the second horizontal stabilizer.

In another aspect, the present disclosure includes a method comprising: rotating a rotatable empennage about a longitudinal axis of an aircraft; independently rotating first and second horizontal stabilizers connected to the empennage about a central axes; and controlling a pitch moment, a roll moment and a yaw moment on the aircraft in response to the rotating of the empennage and the first and second horizontal stabilizers.

In refining aspects, the method includes: rotating the empennage up to three hundred and sixty degrees (360) degrees in either direction about the longitudinal axis with an electric empennage motor; independently rotating the first and second horizontal stabilizers up to one hundred and degrees (180) in either direction with first and second horizontal stabilizer motors, respectively; and changing the rotation speed of at least one of the empennage, first horizontal stabilizer and second horizontal stabilizer relative to a respective motor with a gear transmission system.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

What is claimed is:

1. An aircraft comprising:
   a fuselage defining a longitudinal axis extending between a forward end and an aft end;
   a pair of wings extending laterally from opposing sides of the fuselage;
   a rotatable empennage positioned proximate an aft end of the fuselage;
   first and second horizontal stabilizers extending from opposing sides of the rotatable empennage along a central axis; and
   wherein the first and second horizontal stabilizers are independently rotatable about the central axis.

2. The aircraft of claim 1, further comprising an empennage motor operable for rotating the empennage three hundred and sixty degrees (360) in either direction about the longitudinal axis.

3. The aircraft of claim 2, further comprising first and second horizontal stabilizer motors operably coupled to the first and second horizontal stabilizers, respectively.

4. The aircraft of claim 3, wherein the empennage motor, first horizontal stabilizer motor and second horizontal stabilizer motor are directly or indirectly connected to the empennage and the horizontal stabilizers, respectively.

5. The aircraft of claim 3, further comprising a gear system operably connected between at least one of the motors for the empennage and the horizontal stabilizers.

6. The aircraft of claim 3, further comprising a control system operably connected to the electric motors to control the position of the empennage and the horizontal stabilizers.

7. The aircraft of claim 1, wherein the rotatable empennage and horizontal stabilizers are operable for controlling at least a portion of the yaw, pitch and roll moments acting on the aircraft.

8. The aircraft of claim 1, wherein the first and second horizontal stabilizers are rotatable ninety degrees (90) in either direction.

9. The aircraft of claim 1, wherein an angular position of the central axis is between +/−90 degrees (+/−90) relative to the longitudinal axis and a vertical axis.

10. A rotating empennage comprising:
    an empennage electric motor operable for rotating the empennage about a longitudinal axis;
    a first horizontal stabilizer extending from the empennage;
    a first horizontal stabilizer electric motor operable for rotating the first horizontal stabilizer about a central axis;
    a second horizontal stabilizer extending from the empennage; and
    a second horizontal stabilizer electric motor operable for rotating the second horizontal stabilizer about the central axis.

11. The rotating empennage of claim 10, wherein the longitudinal axis extends between a forward end and an aft end of an aircraft fuselage and the central axis extends at an angular position between +/−90 degrees (+/−90) relative to the longitudinal axis and a vertical axis.

12. The rotating empennage of claim 10, wherein the empennage is rotatable three hundred and sixty degrees (360) in either direction.

13. The rotating empennage of claim 10, wherein the first and second horizontal stabilizers are rotatable ninety degrees (90) in either direction.

14. The rotating empennage of claim 10, further comprising a direct drive linkage connection between at least one of the electric motors and the empennage, the first horizontal stabilizer and/or the second horizontal stabilizer.

15. The rotating empennage of claim 10, further comprising at least one gear drive connection between at least one of the electric motors and the empennage, the first horizontal stabilizer and/or the second horizontal stabilizer.

16. A method comprising:
    rotating a rotatable empennage about a longitudinal axis of an aircraft;
    independently rotating first and second horizontal stabilizers connected to the empennage about a central axes; and
    controlling a pitch moment, a roll moment and a yaw moment on the aircraft in response to the rotating of the empennage and the first and second horizontal stabilizers.

17. The method of claim 16, further comprising rotating the empennage up to three hundred and sixty degrees (360) degrees in either direction about the longitudinal axis with an electric empennage motor.

18. The method of claim 16, further comprising independently rotating the first and second horizontal stabilizers up to one hundred and degrees (180) in either direction with first and second horizontal stabilizer motors, respectively.

19. The method of claim 18, further comprising changing the rotation speed of at least one of the empennage, first horizontal stabilizer and second horizontal stabilizer relative to a respective motor with a gear transmission system.

20. An aircraft comprising:
    a fuselage defining a longitudinal axis extending between a forward end and an aft end;
    a pair of wings extending laterally from opposing sides of the fuselage;
    a rotatable empennage positioned proximate an aft end of the fuselage;

first and second horizontal stabilizers extending from opposing sides of the rotatable empennage along a central axis; and an empennage motor operable for rotating the empennage three hundred and sixty degrees (360) in either direction about the longitudinal axis.

21. An aircraft comprising:

a fuselage defining a longitudinal axis extending between a forward end and an aft end;

a pair of wings extending laterally from opposing sides of the fuselage;

a rotatable empennage positioned proximate an aft end of the fuselage;

first and second horizontal stabilizers extending from opposing sides of the rotatable empennage along a central axis; and first and second horizontal stabilizer motors operably coupled to the first and second horizontal stabilizers, respectively.

* * * * *